United States Patent Office 3,074,083
Patented Jan. 22, 1963

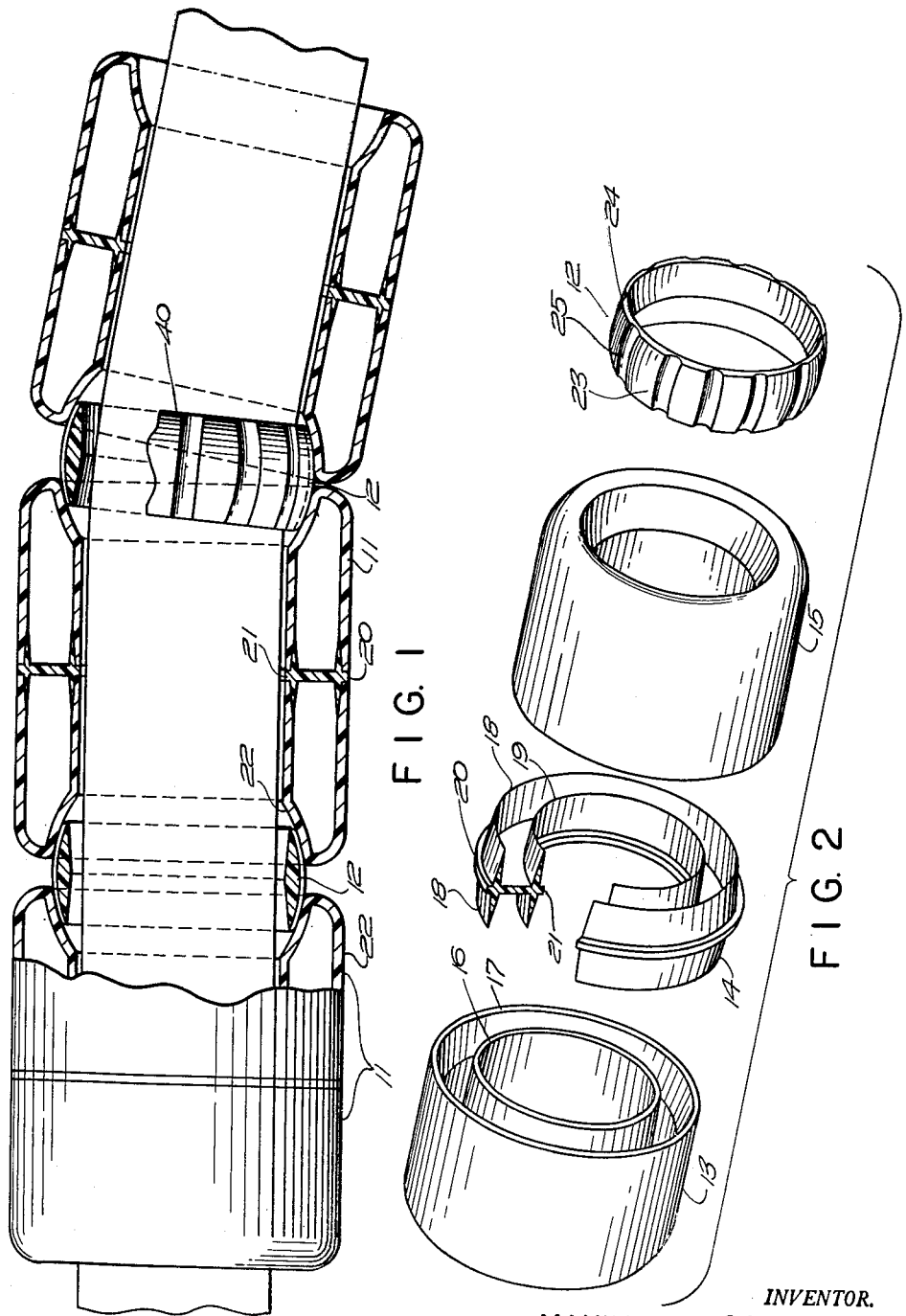

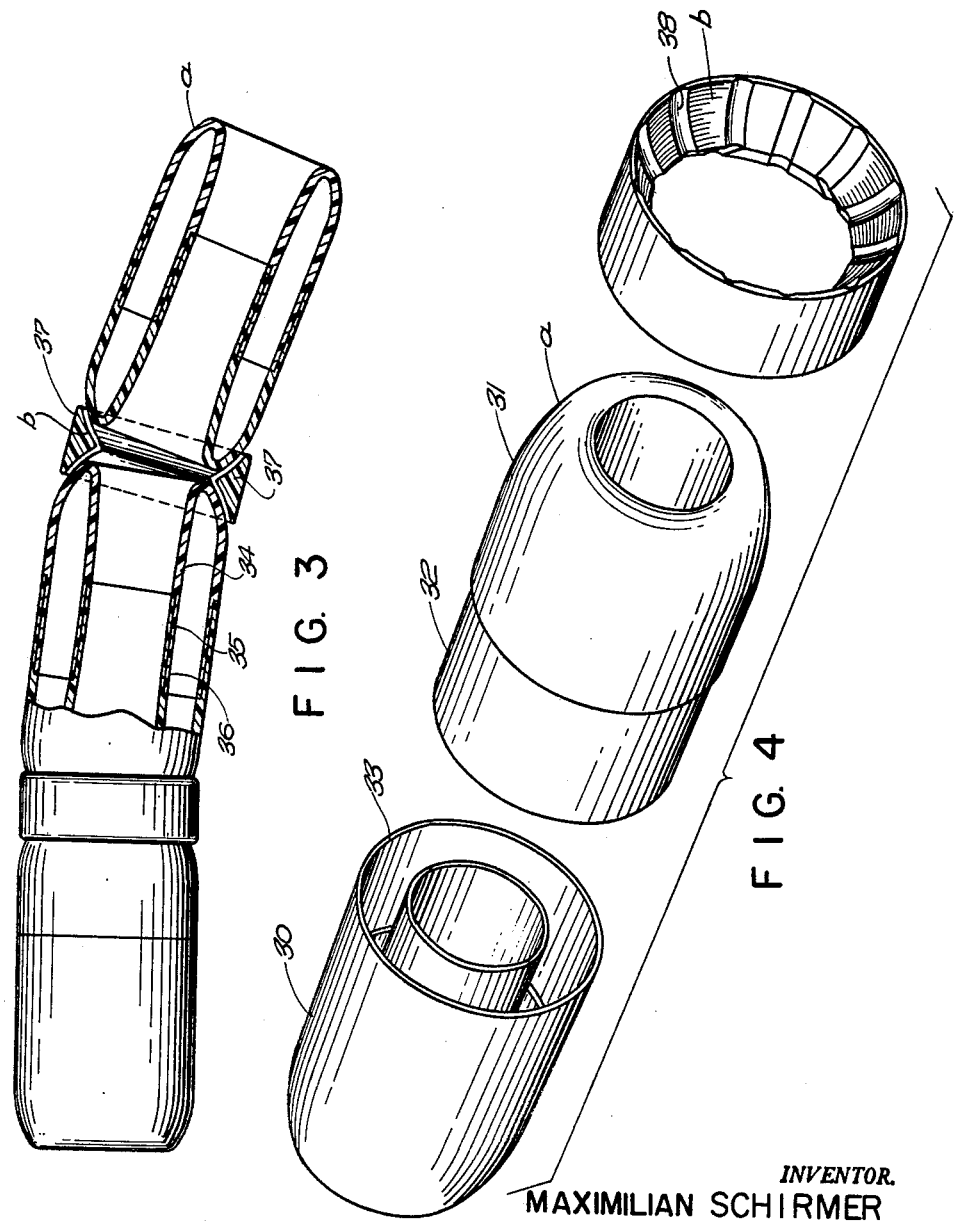

3,074,083
CABLE FLOAT
Maximilian Schirmer, Goffstown, N.H., assignor to Hermsdorf Fixture Manufacturing Co., Inc., Manchester, N.H., a corporation of New Hampshire
Filed Nov. 5, 1959, Ser. No. 851,089
2 Claims. (Cl. 9—8)

The present invention relates to sheaths or protective coverings for marine cables or the like.

The sheaths or protective coverings of the present invention include a series of separate hollow members strung on the cable and adapted to give it buoyancy when in water. The members comprising such a sheath must not only have necessary buoyancy, but they must allow enough flexibility so the cable or hose can be hauled in over a guide-pulley and wound about the drum of a reel without injury either to the cable or the sheath. In the past, attempts have been made to string a series of hollow floats on a cable, but it was found that they tended to slide along the cable each pressing against the next with accumulating pressure so that they tend to render the cable inflexible and may even be crushed.

The sheath embodying the present invention consists of a series of hollow members some, at least, of which are floats having between them intermediate members which are called "unions" and may or may not be floats. Each of said members, whether a float or not, has a hole through it so that it may be strung on a cable or hose. Each member has a face which contacts with a face on the next member and these pairs of faces are spherical and complementary, being alternately convex and concave. The pairs of faces can slide on each other and at the same time maintain contact throughout substantial areas while acting as bearing surfaces allowing swinging movement of adjacent members and permitting the cable to bend. The contacting surfaces are preferably grooved to permit a flow of water into and out of the sheath thus cooling the cable. In practice, I prefer to have a solid union between each pair of floats and to fill each float with uni-cellular plastic material. The floats and unions being free to slide along the cable or wire may or may not be in contact with each other according to the conditions of use.

My invention may be embodied in either of two forms, in one of which, the preferred form, the float members are formed with concave, spherical end surfaces while the union or intermediate member is formed with complementary convex, spherical surfaces, which are received within the concave portions of two adjacent floats. In the other form, the concave spherical surfaces are formed in the union and the floats are provided with convex complementary spherical surfaces received within the concave spherical surfaces of adjacent unions.

The floats are formed preferably from suitable, waterproof plastic and are hollow and made in two parts united to each other at the middle by a slip joint formed on the adjacent halves of the float. The hollow structure thus formed is preferably filled with uni-cellular plastic material to prevent the float from filling with water in case of injury.

The unions, being of comparatively small size, can be molded from solid plastic and need not be hollow.

In this description and in the claims, I have used the word *cable* to designate the flexible member on which the floats are strung, and the word is intended to include other flexible members such as a rope or a wire, or tube such as a hose through which liquid fuel may be conveyed.

Referring to the drawings:

FIG. 1 is a side elevation partly in section showing three float members connected by two intermediate members or unions which are not floats.

FIG. 2 is a view showing a disassembled float 11 and an adjacent union 12.

FIG. 3 is a view similar to FIG. 1 but showing an alternative form of the invention.

FIG. 4 is a view similar to FIG. 2 also showing the several parts of the float shown in FIG. 3.

Referring now to FIGURE 1, at 11—11 there are shown three hollow floats separated by intermediate members or unions 12—12. Each float 11 is formed of three parts (see FIG. 2) 13, 14, and 15, of which the end members 13 and 15 are identical while the central or connecting member 14 unites the two end members 13 and 15. The two end members 13 and 15 are formed alike and have inner and outer tubular flanges 16 and 17 adapted to fit over the flanges 18 and 19 of the connecting member 14. The connecting member 14 is formed with a rib 20 against which the edge of the outer end flange 17 contacts. The edge of the inner tubular member 16 of the end member abuts against a corresponding inner rib 21.

In practice, as shown in FIG. 1, the inner surface of the flanges 17 and the outer surface of the flange 16 and the cooperating surfaces of the connecting member 12 form a slip joint and are slightly tapered so that when the parts are forced together they are held firmly.

Each end member 11 is formed with a concave spherical surface 22 which is a part of the surface of an imaginary sphere.

The union 12 is formed with two convex spherical surfaces 23 which are complementary to the concave spherical surfaces of the two adjacent floats 11. These spherical surfaces are formed with grooves in them to permit the flow of water past them as already explained. The spherical surfaces 23 and 24 are complementary to the concave spherical surfaces 22 of the adjacent float members 11.

Referring now to FIGS. 3 and 4 in which is shown an alternative form of the invention, the float member is made of two parts 30 and 31, one of which is reduced slightly in size as indicated at 32 so that it will slip inside the flange 33 of member 30. The inner tubular member 34 is likewise reduced in size as shown at 35 so that it will slip into the corresponding interior tubular member 36. The ends 37 of each of the tubular members 30 and 31 are spherical and convex as shown clearly at *a* in FIGURE 3. The union 37 is formed with a concave spherical surface *b*. The surfaces *a* and *b* are complementary to each other and the surfaces *b* of the union are grooved as shown at 38. These complementary curved surfaces are theoretically sections of a sphere having the same centre and radius.

I claim:

1. A float to be strung with other floats on a submarine cable, said float being a hollow water tight ring formed in two parts united by a slip joint, each part having a spherical concave end surface which is complementary to a convex spherical surface on the member next adjacent to it on the cable.

2. A float which is one of a series of float members threaded on a submarine cable, some of said float members comprising hollow rings made in two parts, each of which is formed with an inner tubular longitudinal portion and an exterior tubular longitudinal portion the two parts being united by a slip joint, said ring being formed at one end with a concave spherical surface complementary to a convex surface on the next adjacent member on the cable on which the said float members are threaded.

(References on following page)

References Cited in the file of this patent

UNITED STATES PATENTS

| | | |
|---|---|---|
| 471,587 | Williams | Mar. 29 1892 |
| 2,395,892 | Lontz | Mar. 5, 1946 |
| 2,419,053 | Bennett | Apr. 15, 1947 |
| 2,595,113 | Taberer | Apr. 29, 1952 |

FOREIGN PATENTS

| | | |
|---|---|---|
| 198,137 | Great Britain | May 31, 1923 |
| 604,542 | Germany | Oct. 27, 1934 |